FIG. 4

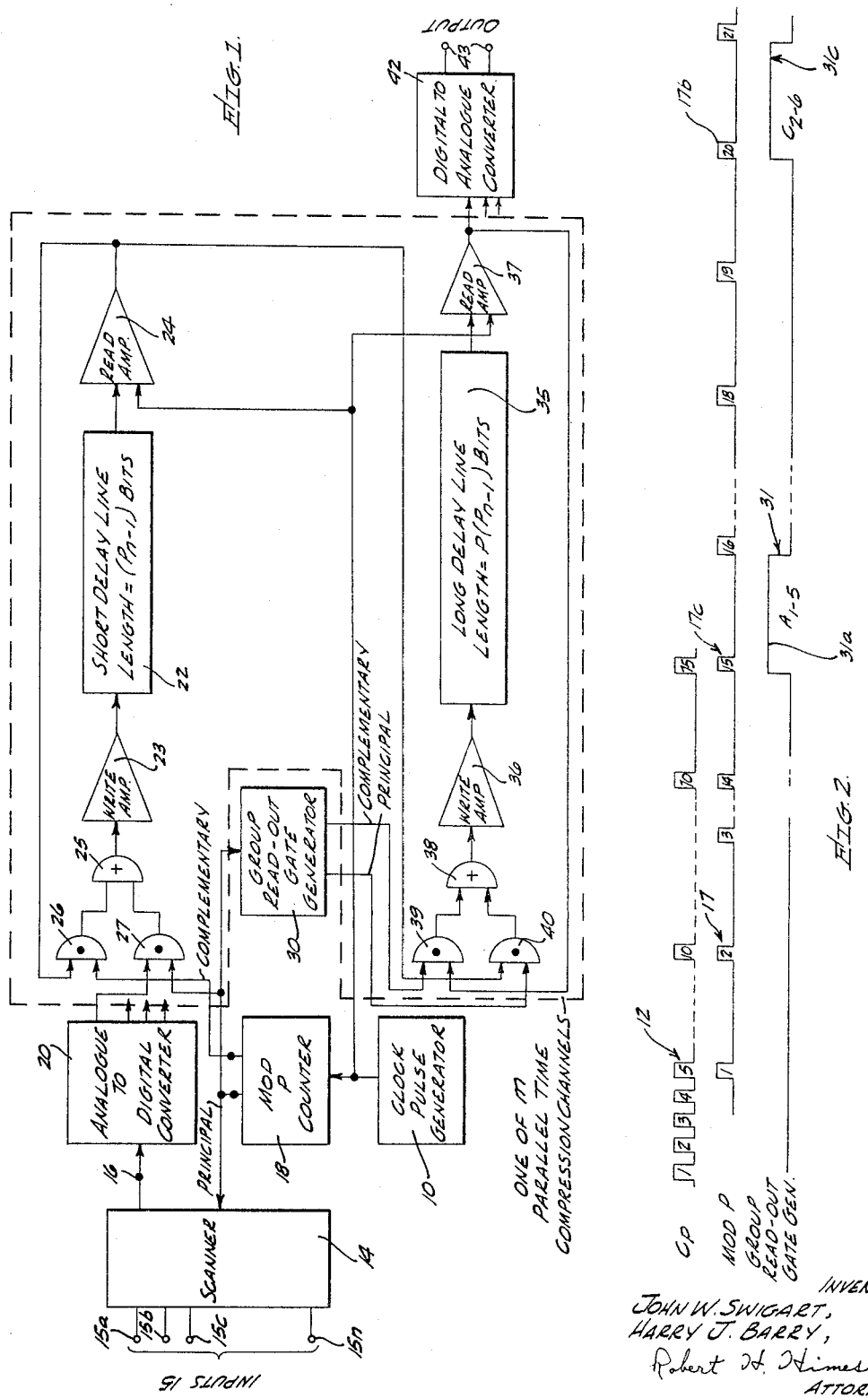

INVENTORS
JOHN W. SWIGART,
HARRY J. BARRY,
BY Robert H. Himes
ATTORNEY

United States Patent Office

3,278,907
Patented Oct. 11, 1966

3,278,907
TIME COMPRESSOR
Harry J. Barry, Placentia, and John M. Swigart, Anaheim, Calif., assignors to Hughes Aircraft Company, Culver City, Calif., a corporation of Delaware
Filed Feb. 17, 1964, Ser. No. 345,445
5 Claims. (Cl. 340—172.5)

This invention relates to an apparatus for compressing time as it relates to signals simultaneously available at many inputs and the sequential reproduction of the compressed signals on a single output line.

One specific example of the intended use of this device is the processing of sonar signals. Currently, the limitation on the target detection range of sonar systems is acoustical noise external to the sonar system itself. This acoustical noise is divided into two categories. First is noise generated within the medium; for example, fish and other marine life, wave action, rain, etc. Second, echoes of the transmitted acoustical pulse from objects other than real targets; for example, bottom reverberation, volume reverberation, etc. Since targets are capable of motion under water and cause a corresponding frequency Doppler shift in the return echo, the sonar receiver must utilize a bandwidth large enough to accommodate the worst extremes of target Doppler shift. This bandwidth, typically of the order of one kilocycle, also allows much of the noise energy described above to be processed by the receiver and creates ambiguity in the resolution of target echo.

One technique in existence for the reduction of this noise is that of Doppler filtering. By this technique the input signal is filtered by a bank of overlapping bandpass filters each of which exhibits optimum bandwidth for target echo. The response of these filters is therefore unaffected by noise external to its passband. Target echo occurring within any one filter then is only obscured by the limited noise present in that filter. The net result of signal processing by Doppler filters is considerable enhancement of signal to noise ratio, otherwise known as signal processing gain.

The potential processing gain obtainable through the use of Doppler filters has long been understood. The widespread application of Doppler filters has been prevented largely by economic factors. Since currently operational sonars form many azimuth receiving beams simultaneously, each requiring a different set of Doppler filters, and since sonars can transmit several different pulse lengths also requiring different sets of Doppler filters, the total number of individual bandpass filters required for a practical system becomes very large, typically of the order of several thousand. The exact number of bandpass filters required is also a function of the maximum target speed (and therefore Doppler shift) to be accommodated.

The use of the time compressor of the present invention is of vital importance in the application of Doppler filtering techniques to sonar systems. The many simultaneous azimuth beams can be sampled and applied to a single set of Doppler filters in a time compressed, time sequential manner thus permitting one set of filters to serve all beams simultaneously without loss of data. Even though it is necessary to duplicate this set of Doppler filters for each sonar transmitted pulse length, the apparatus of the present invention enables the total number of individual bandpass filter elements required for Doppler filtering to be reduced to less than 100.

In general, typical time compression equipment requires that each input signal applied thereto be processed by an identical time compressor. This, in turn, necessitates the employment of separate signal processing equipment for each output line. It is an object of the present invention to provide a system which utilizes a single time compressor for processing a large number of simultaneous inputs.

Still another object of the present invention is to provide a time compression system capable of producing replicas of the many input signals on a single output line.

A further object of the present invention is to provide a time compressor system wherein each of the input signals appear at a single output on a mutually exclusive time sequential basis thereby permitting additional economy in subsequent signal processing equipment.

In accordance with the present invention, the plurality of inputs on which appear the signals to be time compressed are applied to a scanner adapted to periodically and sequentially sample these signals, the respective amplitudes of which are converted to binary numbers of "$m$" bits each. These binary numbers are applied to a first delay line of delay ($Pn-1$) bits where $n$ is the number of lines being scanned and $P$ is the number of bits to be grouped together by the first delay line. The output of the first delay line is applied to a second delay line of delay $P(Pn-1)$ bits in a manner hereinafter described. In each case, however, the first and second delay lines possess a number of identical parallel channels necessary to accommodate the $m$ bits of the respective binary numbers. Binary numbers corresponding to samples of the signals from the plurality of inputs are distributed uniformly throughout the first delay and subsequent numbers placed immediately following the previous number from the same input until the delay line is completely filled at which time the first numbers are replaced with new numbers from the respective inputs.

Periodically each group of numbers corresponding to a single input is applied to the second delay line until groups of numbers from each input are distributed uniformly therealong. Subsequently, groups of numbers corresponding to the same input as the first group of numbers is disposed adjacent thereto until the second delay line is full. This procedure may be repeated, if desired, in which case the third delay line would require a delay of $P^2(Pn-1)$ bits, and a $k^{th}$ delay line, a delay of $P^{k-1}(Pn-1)$ bits. Output from the longest delay line is applied to a digital-to-analog converter to provide the time compressed replica of the respective input signals on a mutually exclusive time sequential basis.

The above-mentioned and other features and objects of the invention and the manner of obtaining them will become more apparent by reference to the following description taken in conjunction with the accompanying drawings, wherein:

FIG. 1 illustrates a schematic block diagram of the apparatus of the present invention;

FIG. 2 illustrates an example of timing waveforms employed in the apparatus of FIG. 1;

FIG. 4 illustrates the status of information as successive group intervals in the long delay line of the apparatus of FIG. 1.

Figure 3:
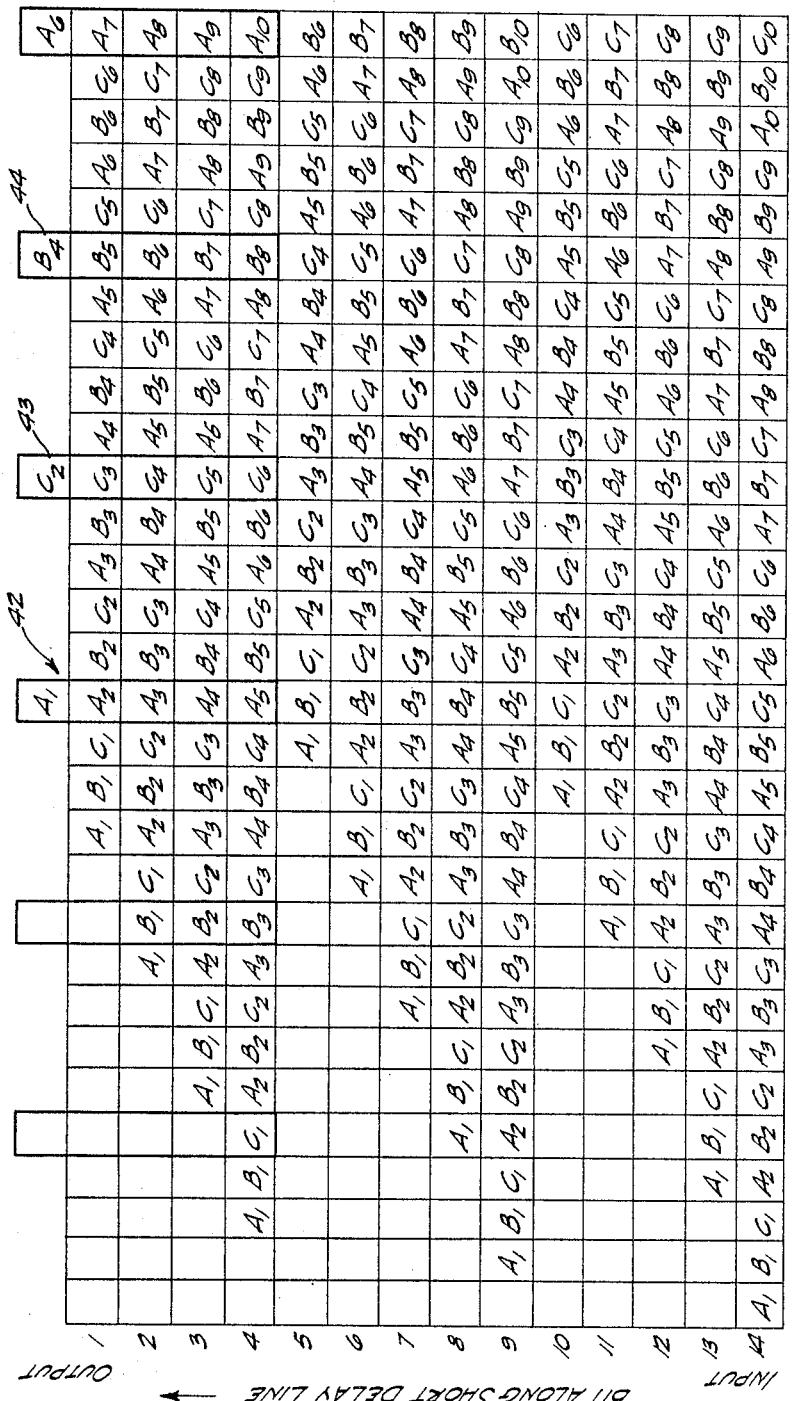
FIG. 3 shows the status of information at successive scanner intervals in the short delay line of the apparatus of FIG. 1.

In describing the apparatus of the present invention, a convention is employed wherein individual "and" and "or" gates are shown as semicircular blocks with the inputs applied to the straight side and the output appearing on the semicircular side. An and gate is indicated by a (.) and an or gate by a (+) in the semicircular block. In the present case, an and gate produces a 1 or information level output signal when every input differs from the 0 level and an or gate produces a 1 or information level output signal when one or more inputs differ from the 0 level.

Referring now to FIG. 1 of the drawings, there is shown a schematic block diagram of a preferred embodiment of the apparatus of the present invention. In particular, a clock pulse generator 10 provides basic timing signals, i.e., clock pulses which occur once during each bit interval of operation for controlling the overall operation of the apparatus of the present invention. A voltage waveform 12, FIG. 2, is illustrative of the voltage excursions of the clock pulses generated by clock pulse generator 10. A scanner 14 with inputs 15a, 15b, 15c . . . 15n and an output 16 operates in response to pulses appearing at the principal output of a Mod–P counter 18 which generates an information level pulse concurrent with every $P^{th}$ clock pulse received from clock pulse generator 10. Voltage waveform 17, FIG. 2, is representative of the principal output generated by Mod–P counter 18 when P equals 5. Mod–P counter 18 also provides a complementary output signal for gating purposes. The inputs 15a, 15b, 15c . . . 15n of scanner 14 are connected to different sources of signals representative of analog quantities thereby enabling successive samples of the analog signals appearing thereat to be taken in response to the pulses 17 generated by Mod–P counter 18. During the subsequent description, bit samples taken at input 15a are designated as $A_1$, $A_2$, $A_3$ . . . ; samples taken at input 15b are designated as $B_1$, $B_2$, $B_3$ . . . ; and samples taken at input 15c are designated as $C_1$, $C_2$, $C_3$ . . . , wherein the subscript indicates the cycle during which the sample was taken and the letter A, B or C corresponds to the lead from which the sample was taken.

An analog-to-digital converter 20 responsive to the output 16 of scanner 14 converts the signals appearing thereat into parallel digital form. In order to simplify the description of the apparatus of the present invention, only a single channel is shown in the drawings. In actual practice, however, it is to be understood that it is necessary to either have a parallel identical channel for each bit of the binary numbers representing the analog samples or, alternatively, to have a serial code within an individual bit interval, for example, to represent the successive analog samples. In either case, techniques of this type are well known in the computer art and, accordingly, do not require further explanation.

The time compression of the individual bits into groups is provided by delay devices which may be of the shift register type or, for example, a short delay line 22, as illustrated, which receives information from a write amplifier 23 and delivers information to a read amplifier 24. The extent of the delay provided by delay line 22 is made equal to $(Pn-1)$ bits wherein $n$ is the number of input signals being sampled and P is the number of clock pulses employed to generate a Mod–P output pulse, i.e., the frequency relative to the clock rate at which samples are taken. The write amplifier 23 receives an input from an or gate 25 which, in turn, has two inputs connected to the respective outputs of and gates 26 and 27 which are shown, by way of example; i.e., the write amplifier 23 may include apparatus to provide gating of this type as an integral part of the operation thereof. And gate 27 has a first input connected to one of the $m$ outputs of the analog-to-digital converter 20 and a second input connected to the principal output of the Mod–P counter 18. And gate 26, on the other hand, has a first input connected to the output of read amplifier 24 and a second input connected to the complementary output of Mod–P counter 18. As is evident from the above, the application of the principal and complementary outputs of Mod–P counter 18 to the and gates 27, 26, respectively, allows only one signal to be applied to the write amplifier 23. Thus, whenever a sample is taken, the sample will be entered into the delay line 22 through and gate 27, or gate 25 and write amplifier 23. At all other times, the samples previously entered into the delay line 22 will be recirculated through the read amplifier 24, and gate 26, or gate 25 and write amplifier 23. The exact manner in which time compression is achieved in delay line 22 will be hereinafter illustrated and explained in connection with FIG. 3.

A group readout gate generator 30 in response to the principal output of Mod–P counter 18 generates an information level signal of a waveform 31 concurrent with every $p^{th}$ output pulse of the voltage waveform 17 generated at the principal output of Mod–P counter 18. This gate signal 31 remains at information level until the occurrence of the next succeeding pulse of waveform 17. A complementary output signal is also provided which constitutes a bilevel signal complementary to the principal output signal 31.

A long delay line 35 provides time sequential organization of the groups formed by the short delay line 22. The long delay line 35 receives information from a write amplifier 36 and delivers information to a read amplifier 37 along with the clock pulse waveform 12 from clock pulse generator 10. The write amplifier 36 is responsive to the output of an or gate 38 which has a first input connected to the output of a two-input and gate 39 and a second input connected to the output of a two-input and gate 40. The two-input and gate 39 has a first input connected to the complementary output 32 of group readout generator 30 and a second input connected to the output of read amplifier 37. The and gate 40, on the other hand, has an input connected to the output of read amplifier 24 and a second input connected to the principal output of group readout generator 30. Thus, it is apparent that whenever a group of information is read out from delay line 22, no information is recirculated from the output of the long delay line 35. At all other times, however, information is recirculated from the output of read amplifier 37 through and gate 39, or gate 38 and write amplifier 36, back into the input of long delay line 35.

In addition to being recirculated, the digital output information appearing at the output of read amplifier 37 along with digital output information from the other channels, not shown, is also converted to analog form by means of a digital-to-analog converter 42, thereby providing continually updated time compressed signals in serial form representative of the analog input signals at inputs 15a, 15b, 15c . . . 15n at output terminals 43. If desired, a third or $k^{th}$, still longer, delay line may be employed in which case a length of $P^2(Pn-1)$ or $P^{k-1}(Pn-1)$, respectively, bits would be used.

The manner in which time compression of the sample taken by the scanner 14 is achieved is illustrated in FIGS. 3 and 4 of the drawings. In the example illustrated, P is taken to equal 5 and the number of inputs three, namely, 15a, 15b and 15c. Thus, according to the previous designation, the signals A, B and C represent samples taken from inputs 15a, 15b and 15c, respectively. Further, subscripts 1, 2, 3, 4, 5 . . . are employed to indicate the cycle during which a particular sample was taken. In order to achieve time compression, it is evident, therefore, that the samples should be arranged in ascending sequence, such as for example, $A_1$, $A_2$, $A_3$, $A_4$ and $A_5$. Under the foregoing circumstances, the short delay line 22 provides a delay of $(Pn-1)$ or $(5\times3-1)=14$ bits. The bit position along the delay line is indicated along the abscissa with the input at the bottom and the output at the top, as shown in the chart. The successive positions in proceeding from left to right as shown in the drawing indicate the location of information in the delay line 22 for samples taken in sequence, i.e., $A_1$, $B_1$, $C_1$, $A_2$, $B_2$, $C_2$ . . . . During every $P^{th}$ clock pulse, or 5th timing pulse in the example illustrated, successive samples A, B or C are introduced into the delay line 22 immediately following a sample of the same signal from the preceding cycle. Also, the and gates 26, 27 operate to introduce the newest sample into the delay line and reject the signal emerging from the delay line during this bit interval whereby the signals constituting each group progressively change so as to always include the last five samples taken by the scanner 14 from the corresponding input.

Upon the formation of each group of five samples, the group is read out by means of the gating signal waveform 31 generated by group readout gate generator 30. Samples enclosed by rectangles 42, 43 and 44, FIG. 3, indicate the signals read out and applied to long delay line 35 through and gate 39. In the case of rectangle 42, the sample $A_1$ emerges from the delay line 22 during the same bit interval that the sample $C_5$ is introduced at the input. Consequently, the initial portion of the waveform 31a, FIG. 2, for reading out the signals $A_1$, $A_2$, $A_3$, $A_4$, $A_5$ must necessarily occur concurrently with the Mod–P pulse 17c for sampling and writing sample $C_5$ into the delay line.

Although complete groups of samples have been formed in delay line 22, a subsequent group of samples is not read out until the commencement of the 5th (in general form, the $P^{th}$) Mod–P pulse 17b following the Mod–P pulse 17a. The samples thus read out are identified by rectangle 43 and the readout controlled by waveform 31c. The delay of 5 groups (P groups for general case) is necessary to achieve appropriate organization of the groups in the long delay line 35. It is to be noted that the group readout does not necessarily occur in the same order as the order in which the samples were taken. Lastly, the rectangle 44 defines signals read out commencing with the reading in of the signal $A_9$. Subsequent readouts are performed periodically relative to those described above.

Referring to FIG. 4, there is shown the manner in which the groups formed by delay line 22 are organized by long delay line 35. In this chart, the subscripts indicate the specific samples which make up a particular group; e.g., $B_{4-8}$ represents sample $B_4$, $B_5$, $B_6$, $B_7$, $B_8$. The groups enter the delay line 35 through and gate 40, or gate 38 and write amplifier 36. During times when a group is not being entered, groups already in the delay line 35 are recirculated from the output of read amplifier 37 through and gate 39 to the write amplifier 36. In operation, the groups are arranged in sequence in the same manner as the individual samples in FIG. 3. The output of delay line 35, however, may be read continuously through read amplifier 37 and digital-to-analog converter 42, in which event the compound groups are successively "updated" by the addition of the newest group and the deletion of the oldest group. In that the output signal represents a time compressed serial replica of all of the input signals applied to input terminals 15a, 15b and 15c, it may be desired to effect switching to segregate the information corresponding to each respective input. In the interests of saving on the number of filters required, however, this switching is not normally done until all necessary filtering and other operations are performed and, hence, is not illustrated in the drawings.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for generating a time compressed sequential replica of a plurality of input signals available on a corresponding plurality of input terminals, said apparatus comprising scanning means connected to said input terminals for taking periodic analog samples of said input signals in a constant order of rotation; means coupled to said scanning means for converting said analog samples into digital signals; means including a first delay device and responsive to said digital signals for continually recirculating the last occurring digital signals therethrough, said first delay device being adapted to operate at a predetermined clock pulse repetition rate, an integral number of which occur during each periodicity of said analog samples, and for providing a bit delay equal to one less than the product of the number of said input signals times said integral number whereby said digital signals are formed into groups of digital signals corresponding to each respective input terminal; means including a second delay device responsive to groups of said digital signals occurring once for each said integral number thereof and having a bit delay equal to said integral number times one less than the product of said number of input signals times said integral number for recirculating the last received groups therethrough thereby to organize all groups from each input terminal in sequence; and means connected to the output of said second delay device for converting said digital signals into analog signals thereby to generate a time-compressed time-sequential replica of said plurality of input signals.

2. The apparatus for generating a time compressed sequential replica of a plurality of input signals available on a corresponding plurality of input terminals as defined in claim 1 which additionally includes $k$ delay devices wherein $k$ assumes no less than one successive positively increasing integers commencing with 3, said $k$ delay devices being disposed intermediate said second delay device and said means for converting said digital signals into analog signals for recirculating the last received groups by each respective delay device, each said $k^{th}$ delay device having a bit delay equal to said integral number to the $(k-1)$ power times one less than the product of said number of input signals times said integral number.

3. An apparatus for generating a time-compressed sequential replica of a plurality of input signals available on a corresponding plurality of input terminals, said apparatus comprising scanning means connected to said input terminals for taking periodic analog samples of said input signals; means coupled to said scanning means for converting said analog samples into digital signals each having $m$ parallel digits wherein $m$ is a positive integer no less than two; means including $m$ short delay devices responsive respectively to said $m$ digits of said digital signals for continually recirculating the last occurring digital signals therethrough, said $m$ short delay devices being adapted to operate at a predetermined clock pulse repetition rate, an integral number of which occur during each periodicity of said analog samples and for providing a bit delay equal to one less than the product of the number of said input signals times said integral number whereby digital signals in said $m$ delay devices are formed into groups of digital signals corresponding to each respective input terminal; means including $m$ long delay devices, each having a bit delay equal to said integral number of times one less than the product of said number of input signals times said integral number and responsive to respective groups of the digits of said digital signals occurring once for each integral number thereof for recirculating the last received groups of digits therethrough thereby to organize all groups from each input terminal in sequence; and means connected to the respective outputs of said $m$ long delay devices for converting said $m$ digits of said successive digital signals into analog signals thereby to generate a time-compressed time-sequential replica of said plurality of input signals.

4. An apparatus for generating a time-compressed sequential replica of a plurality of input signals available on a corresponding plurality of input terminals, said apparatus comprising means for generating sequential timing signals; means responsive to said timing signals for generating a sampling signal for each predetermined number thereof; scanning means responsive to said sampling signals and connected to said input terminals for taking successive analog samples of said input signals in a constant order of rotation corresponding to the occurrence of each sampling signal; means coupled to said scanning means for converting said analog samples into digital signals; means including a first delay device adapted to operate in response to said timing signals and responsive to said digital signals for continually recirculating the last occurring digital signals therethrough, said first delay device having a bit delay equal to one less than the product of the number of said input signals times said predetermined number whereby said digital signals are formed into groups of digital signals corresponding to each respective input terminal; means including a second delay device responsive to the groups of digital signals occurring once for each predetermined number thereof and having a bit delay equal to said predetermined number times one less than the product of said number of input signals times said predetermined number for continually recirculating the last received groups therethrough thereby to organize all groups from said input terminals in sequence; and means connected to the output of said second delay device for converting said digital signals into analog signals thereby to generate a time-compressed time-sequential replica of said plurality of input signals.

5. The apparatus for generating a time-compressed sequential replica of a plurality of input signals available on a corresponding plurality of input terminals as defined in claim 4 which additionally includes gate generating means responsive to said sampling signals for generating a gating signal commencing concurrently with the sampling pulse occurring with the last of the first predetermined number thereof and with the last of every predetermined number thereafter, said gating pulse having a duration equal to a predetermined number of said timing pulses for controlling the digital signals applied to said second delay device from said first delay device.

No references cited.

MAYNARD R. WILBUR, *Primary Examiner.*

A. L. NEWMAN, *Assistant Examiner.*